(12) United States Patent
Coulon et al.

(10) Patent No.: US 9,739,893 B2
(45) Date of Patent: Aug. 22, 2017

(54) METHOD FOR DETECTING A MOVING RADIOACTIVE SOURCE AND ASSOCIATED DEVICE

(71) Applicant: Commissariat à l'énergie atomique et aux énergies alternatives, Paris (FR)

(72) Inventors: Romain Coulon, Chaulgnes (FR); Vladimir Kondrasovs, Palaiseau (FR); Karim Boudergui, Nogent-le-Phaye (FR); Mounir Bakkali, Meudon (FR); Stéphane Normand, Isigny le Buat (FR)

(73) Assignee: COMMISSARIAT A L'ENERGIE ATOMIGUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/761,466

(22) PCT Filed: Jan. 21, 2014

(86) PCT No.: PCT/EP2014/051070
§ 371 (c)(1),
(2) Date: Jul. 16, 2015

(87) PCT Pub. No.: WO2014/114608
PCT Pub. Date: Jul. 31, 2014

(65) Prior Publication Data
US 2015/0346352 A1 Dec. 3, 2015

(30) Foreign Application Priority Data

Jan. 23, 2013 (FR) ...................................... 13 50583

(51) Int. Cl.
*G01T 1/16* (2006.01)
*G01T 7/08* (2006.01)
*G01V 5/00* (2006.01)

(52) U.S. Cl.
CPC .................. *G01T 1/16* (2013.01); *G01T 7/08* (2013.01); *G01V 5/0075* (2013.01)

(58) Field of Classification Search
CPC ......................................................... G01T 1/16
See application file for complete search history.

(56) References Cited

U.S. PATENT DOCUMENTS 4,466,067 A * 8/1984 Fontana ................ G01S 3/8083
342/424
8,242,456 B1 * 8/2012 Hecht .................. G01V 5/0075
250/252.1

(Continued)

OTHER PUBLICATIONS

"Measurement and Detection of Radiation" Third Edition, Nicholas Tsoulfanidis and Sheldon Landsberger, CRC Press 2011.*

(Continued)

*Primary Examiner* — Edwin Gunberg
(74) *Attorney, Agent, or Firm* — Pearne & Gordon, LLP

(57) ABSTRACT

A method for detecting a radioactive source moving on a linear path substantially parallel to an alignment of N detectors. The method includes: forming $N \times N_t$ pulse counting values $M_{i,t}$ (i=1, 2, . . . , N and t=1, 2, . . . , $N_t$) from $N \times N_t$ detection signals delivered by the N detectors in the form of a succession over time of $N_t$ sets of N signals simultaneously detected by the N detectors over a same duration $\Delta t$, a pulse counting value representing a number of pulses detected by a detector over a duration $\Delta t$; and computing, using a computer: a set of $N_t$ correlation products $R_t$, a static mean $\overline{R}$ of the $N \times N_t$ counting values, a correlation condition for each correlation product $R_t$.

7 Claims, 8 Drawing Sheets

(56) References Cited

U.S. PATENT DOCUMENTS

2007/0034808 A1    2/2007   Evans
2012/0166120 A1    6/2012   Corre
2012/0318998 A1   12/2012   Kondrasovs
2013/0299742 A1   11/2013   Hamel
2014/0312236 A1   10/2014   Kondrasovs

OTHER PUBLICATIONS

Ashok Sundaresan et al., "Distributed Detection of a Nuclear Radioactive Source using Fusion of Correlated Decisions" Information Fusion, 10th International Conference on, IEEE, Jul. 1, 2007.
R. B. Vilim et al., "Sensitivity Improvement in Low-Profile Distributed Detector Systems for Tracking Sources in Transit" Technologies for Homeland Security, IEEE Conference on IEEE, May 1, 2007.
Lijun Qian et al., "Quickest Detection of Nuclear Radiation using a Sensor Network" Homeland Security, IEEE Conference on Technologies for IEEE, Nov. 13, 2012.
Search report issued in French Patent Application No. FR 13 50583 dated Sep. 11, 2013.
International Preliminary Report on Patentability issued in Application No. PCT/EP2014/051070 dated Apr. 15, 2015.
International Search Report issued in Application No. PCT/EP2014/051070 dated Apr. 4, 2014.
Written Opinion issued in Application No. PCT/EP2014/051070 dated Apr. 4, 2014.

\* cited by examiner

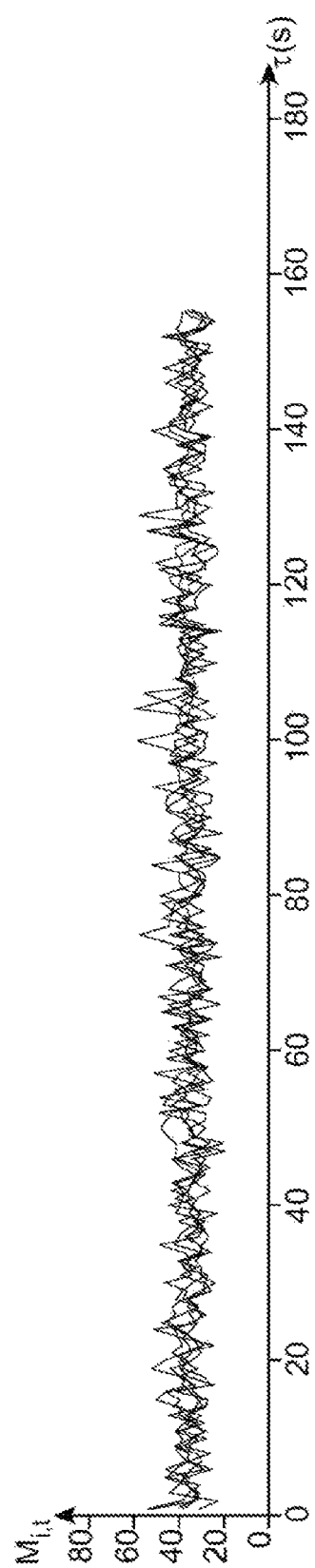
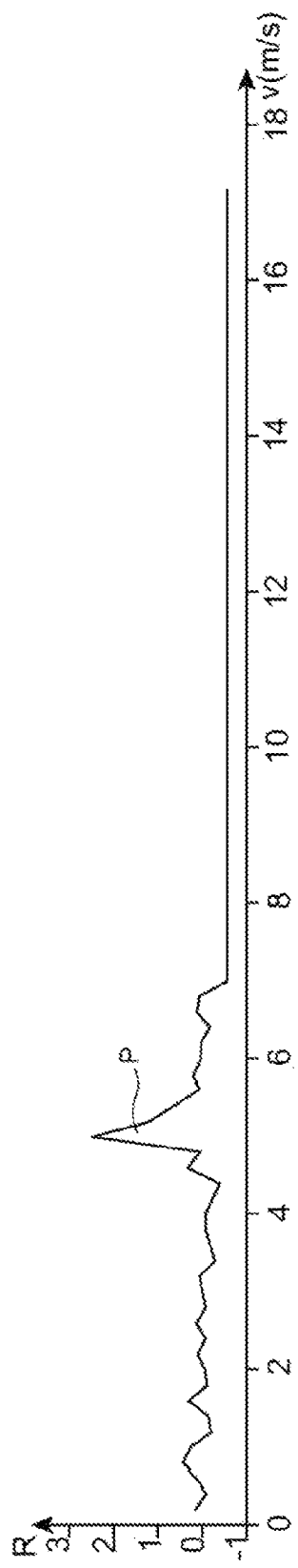
FIG. 4A
FIG. 4B

METHOD FOR DETECTING A MOVING RADIOACTIVE SOURCE AND ASSOCIATED DEVICE

TECHNICAL FIELD AND PRIOR ART

The invention relates to a method for detecting a moving radioactive source and the associated device.

The invention has applications in many fields and, particularly advantageously, in the safety field.

For safety reasons, it is often necessary to detect the possible passage of a radioactive source in the vicinity of a place where an industrial process is taking place or during the supervision of an infrastructure.

The detection sensitivity of a radioactive source depends on the radioactive environment level (background noise), the source intensity, and the passage time of this source in front of the detection system. It is known to adjust an alarm threshold with respect to the level of statistical fluctuations in the radioactive environment in order to trigger a signal which proves the presence of a radioactive source.

Systems for detecting moving sources comprise a plurality of measuring channels. Some of these systems perform the detection of mobile sources by thresholding each measuring channel and measuring, by gross summation, signals delivered by the different measuring channels at the time of detection. In order to reduce the false alarm rates, systems which work based on an independent detection of each measuring channel and on an a posteriori detection correlation (cf. "Distributed detection of a nuclear radioactive source using fusion correlation decisions" A. Sundaresan, P. K. Varshney, N. S. V Rao in *Proceeding of the International Conference on Information Fusion*, 2007). If this approach indeed enables a reduction of false alarm rates, it does not suppress the conventional thresholding step which limits the intrinsic detection capacities of detectors.

The invention does not have this drawback.

DISCLOSURE OF THE INVENTION

Indeed, the invention relates to a method for detecting a radioactive source moving on a linear path substantially parallel to an alignment of N detectors, N being an integer equal to or greater than 2. The method comprises the following steps:

forming $N \times N_t$ pulse counting values $M_{i,t}$ ($i=1, 2, \ldots, N$ and $t=1, 2, \ldots, N_t$) from $N \times N_t$ detection signals delivered by the N detectors in the form of a succession over time of $N_t$ sets of N signals simultaneously detected by the N detectors over a same duration $\Delta t$, a pulse counting value representing a number of pulses detected by a detector over a duration $\Delta t$, and computing, using a computer:

a set of $N_R$ correlation products $R_Z$ so that:

$R_z = \Pi_{i=1}^{N} M_{i,[(N-i)z+1]}$ ($z=1,2, \ldots, N_R$)

with $$N_R = \frac{N_t - 1}{N - 1},$$

$N_t$ being a very large integer ahead of N, a statistical mean $\overline{R}$ of the $N_t$ products $\Pi_{i=1}^{N} M_{i,t}$ counting values such that:

$$\overline{R} = \frac{1}{N_t} \sum_{t=1}^{N_t} \prod_{i=1}^{N} M_{i,t}$$

a standard deviation $\sigma(\overline{R})$ of the $N_t$ products $\Pi_{i=1}^{N} M_{i,t}$ such that:

$$\sigma(\overline{R}) = \sqrt{\frac{1}{N_t} \sum_{t=1}^{N_t} \left( \overline{R} - \prod_{i=1}^{N} M_{i,t} \right)^2}$$

a correlation condition for each correlation product $R_t$ so that:

if $R_z \geq \overline{R} + K_2 \sigma(\overline{R})$, $K_2$ being a scalar, a radioactive source is considered to have moved in front of the detectors, and if $R_z < \overline{R} + K_2 \sigma(\overline{R})$, no source is considered to have moved in front of the detectors.

As mentioned above, the number $N_R$ of correlation products is given by the equation:

$$N_R = \frac{N_t - 1}{N - 1},$$

where N is the number of detectors and $N_t$ the number of sets of N signals simultaneously detected by the N detectors over a same duration $\Delta t$. The numbers $N_R$, $N_t$, and N are all integers. It is consequently clear that, for a given number N of detectors, the number $N_t$ is chosen so that $N_R$ is also an integer. By way of non-limiting example, for a number N of detectors equal to 10, the number $N_t$ can be equal to 10000, which induces a number $N_R$ equal to 1111.

It also appears from the formula of the correlation product $R_Z$ that all the measurements performed over the duration $\Delta t$ are not used to compute the product $R_Z$. It is an advantage of the invention not to use all the performed measurements, but only the measurements useful for forming the desired result.

According to an additional feature of the invention, as soon as a radioactive source is considered to have moved in front of the detectors, the speed V of the source is computed such that:

$V = d/(T \times \Delta t)$, where d is the distance separating two neighbouring detectors and T is the rank t of a set of N pulse counting values for which the correlation product $R_t$ is maximum.

According to another additional feature of the invention, as soon as a radioactive source is considered to have moved in front of the detectors, the intensity I of the source is computed so that:

$$I = \frac{1}{N} \sum_{i=1}^{N} M_{i,(N-i)T+1} - \frac{1}{N \times N_t} \sum_{t=1}^{N_t} \left[ \sum_{i=1}^{N} M_{i,t} \right]$$

In a particular embodiment of the invention, the pulse counting values are smoothed before the computing step implemented by the computer.

The invention also relates to a device for detecting a radioactive source moving over a substantially linear path, characterised in that it comprises means for implementing the method of the invention.

BRIEF DESCRIPTION OF THE FIGURES

Other features and advantages of the invention will appear upon reading the following description, made in reference to the appended figures, among which:

FIGS. 4A and 4B illustrate the method for detecting a radioactive source of the invention in the case of a low intensity and low speed radioactive source;

DISCLOSURE OF PARTICULAR
EMBODIMENTS OF THE INVENTION

Figure 1:
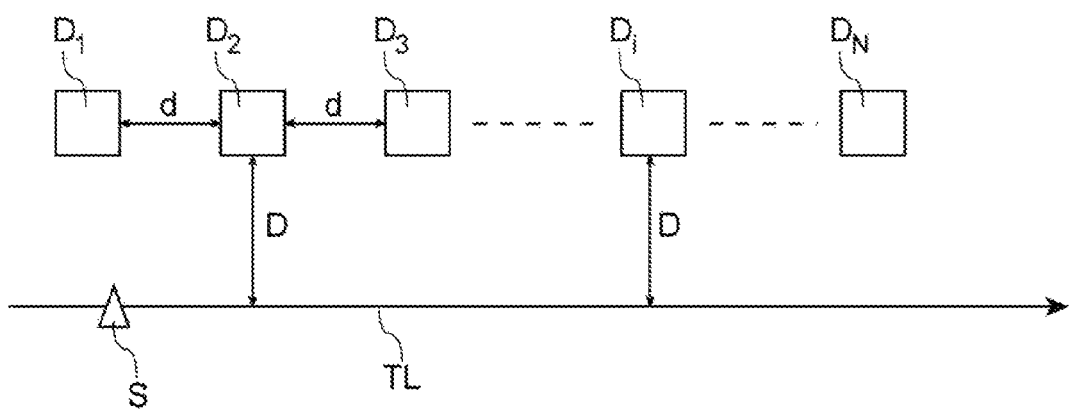
FIG. 1 symbolically shows a radioactive source moving in front of a set of detectors of the device for detecting a moving radioactive source of the invention.

FIG. 1 symbolically shows a radioactive source moving in front of a set of detectors.

The radioactive source S which is wanted to be detected moves in principle over a linear path TL (road/conveyor/ etc.). The N detectors $D_1, D_2, \ldots, D_i, \ldots, D_N$ of the detection device are aligned parallel to the path TL. A distance d separates two neighbouring detectors and a distance D separates each detector $D_i$ (i=1, 2, . . . N) from the path TL.

Figure 2:
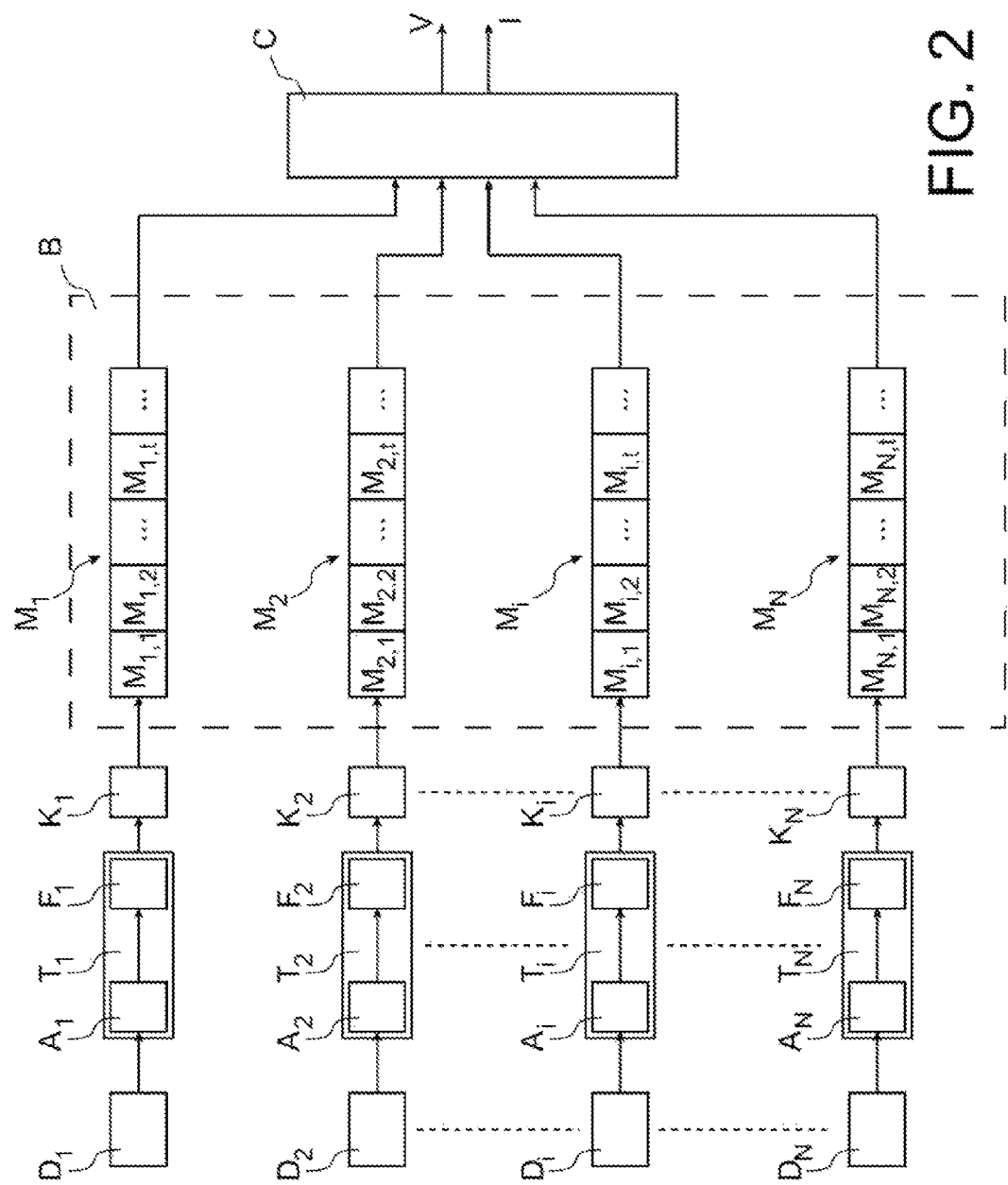
FIG. 2 shows the schematic diagram of an exemplary device for detecting a moving radioactive source of the invention.

FIG. 2 shows the schematic diagram of an exemplary detection device implementing the method for detecting a moving radioactive source of the invention.

The device comprises N detectors $D_i$ (i=1, 2, . . . , N), N processing circuits $T_i$, N pulse counting circuits $K_i$, a memory block B made of N FIFO memories $M_i$ (FIFO stands for "First In First Out"), and a computer C.

Each detector $D_i$ (i=1, 2, . . . , N) which detects an incident radiation delivers a pulse signal. The pulse signal delivered by the detector $D_i$ is then processed by a processing circuit $T_i$, the latter comprising, for example, an amplifier $A_i$ and a filtering circuit $F_i$. Each processing circuit $T_i$ delivers an electronic pulse. The electronic pulses delivered by a processing circuit $T_i$ are counted by a counting circuit $K_i$. Counting the electronic pulses is made by successive time slots of a duration $\Delta t$. The counting values which are delivered by the counter $K_i$ are transmitted to the FIFO memory $M_i$. A FIFO memory $M_i$ consequently contains a succession of counting values $M_{i,1}, M_{i,2}, \ldots M_{i,t}$, etc., where t is the time position index of the counting values in the history of the FIFO memories.

According to the known principle which governs the FIFO memories, as soon as a FIFO memory is full, the oldest counting value which is stored in the memory is extracted to enable a new counting value to be stored. The counting values which are simultaneously extracted from different memories $M_i$ are then transmitted to the computer C. In a particular embodiment of the invention (not shown in the figure), the counting values are smoothed by a smoothing circuit before being transmitted to the FIFO memory.

Figure 3:
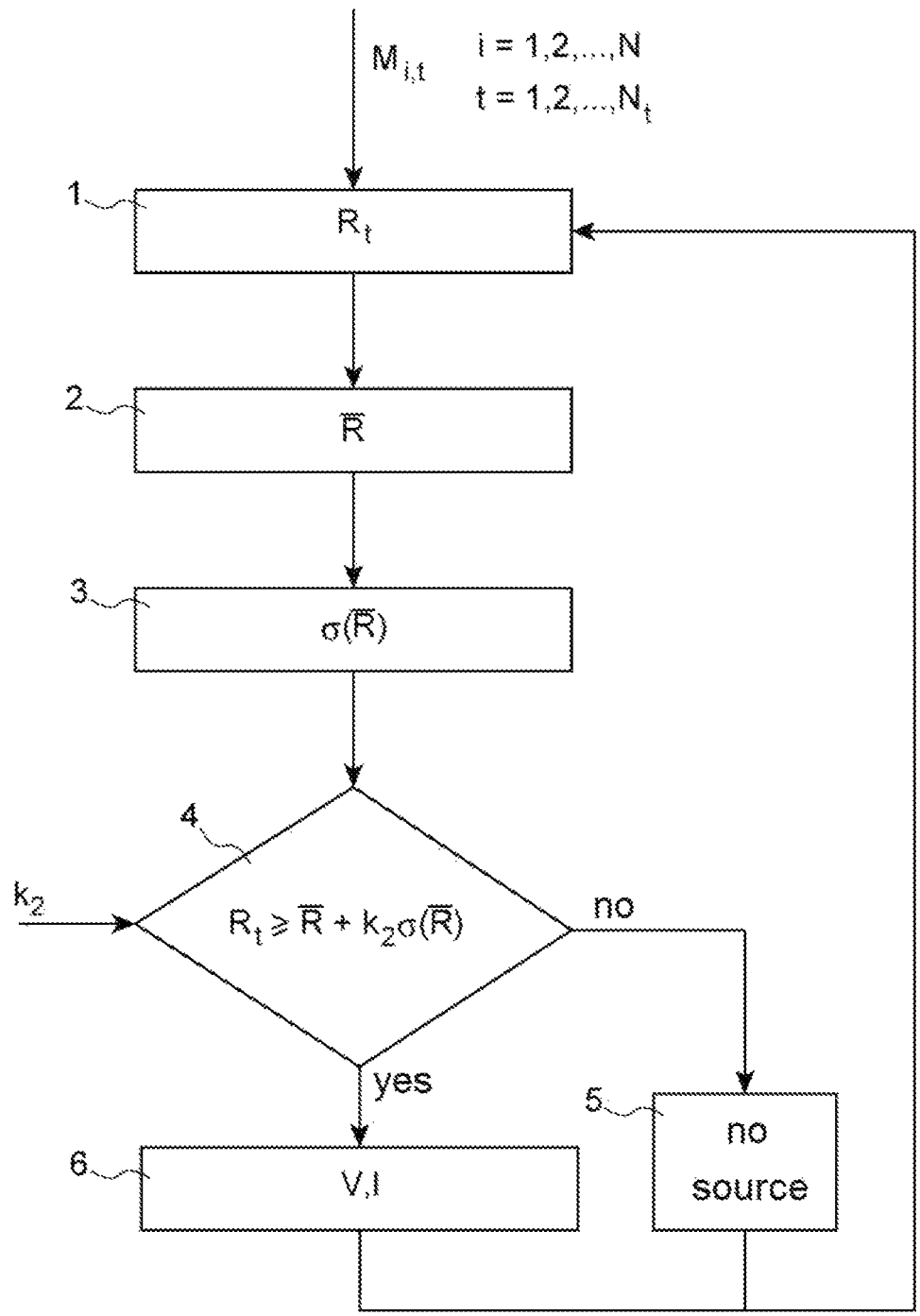
FIG. 3 shows a processing method involved in the method for detecting a moving radioactive source of the invention.

The computer C implements a method for processing counting values $M_{i,t}$. FIG. 3 illustrates this processing method.

In a first step (step 1), the computer C computes $N_R$ correlation products $R_Z$ (z=1, 2, . . . , $N_R$) such that:
$R_Z \Pi_{i=1}^{N} M_{[i,(N-i)z+1]+}$, with $$N_R = \frac{N_t - 1}{N - 1},$$

$N_t$ being a very large integer ahead of N.

The statistical mean $\overline{R}$ of the $N_t$ products $\Pi_{i=1}^{N} M_{i,t}$ is then computed (step 2):

$$\overline{R} = \frac{1}{N_t} \sum_{t=1}^{N_t} \prod_{i=1}^{N} M_{i,t}$$

Next, the standard deviation $\sigma(\overline{R})$ of the $N_t$ products $\Pi_{i=1}^{N} M_{i,t}$ is then computed (step 3):

$$\sigma(\overline{R}) = \sqrt{\frac{1}{N_t} \sum_{t=1}^{N_t} \left(\overline{R} - \prod_{i=1}^{N} M_{i,t}\right)^2}$$

Once the standard deviation is computed, it is verified whether there is a significant correlation of the time series among the $R_t$ values (step 4). It is thus verified whether the following inequation is performed or not:

$R_z \geq \overline{R} + K_2 \sigma(\overline{R})$ where the magnitude $K_2$ is a scalar chosen with respect to the false alarm rate desired for detection. The order of magnitude of $K_2$ is a few units.

If the above inequation is not performed, no source is considered to have moved in front of the detectors (step 5: no source).

If the above inequation is performed, a source is considered to have moved in front of the detectors and its speed V and/or its intensity I (number of hits per second) are computed (step 6).

Among the $R_t$ values, there is an $R_t$ value which is maximum. Letting T be the rank t for which the $R_t$ value is maximum, we therefore have:

$V = d/(T \times \Delta t)$, where d is the distance separating two neighbouring detectors, and $$I = \frac{1}{N}\sum_{i=1}^{N} M_{i,(N-i)T+1} - \frac{1}{N \times N_t}\sum_{t=1}^{N_t}\left[\sum_{i=1}^{N} M_{i,t}\right]$$

As soon as the steps 5 and 6 are carried out, a new computing cycle is started (back to step 1).

FIGS. 4A and 4B illustrate the method for detecting a radioactive source of the invention in the case of a low intensity and low speed radioactive source.

The results illustrated in FIGS. 4A and 4B are obtained for a detection device made of five detectors. A low intensity radioactive source moves at a speed of 5 m/s in front of the detectors.

FIG. 4A shows the counting values $M_{i,t}$ (i=1, 2, . . . , 5) associated with each of the five detectors involved in the detection device of the invention, as a function of time τ. With reference to the previously defined magnitudes t, and Δt, we have:

$$\tau = t \times \Delta t$$

FIG. 4B represents the correlation product R computed as a function of a speed v representing the speed of the source. With reference to the previously defined magnitudes d, t and Δt, we have:

$$v = d/t \times \Delta t$$

It can be noticed that the correlation product clearly shows a peak P at a speed substantially equal to 5 m/s.

Figure 5A:
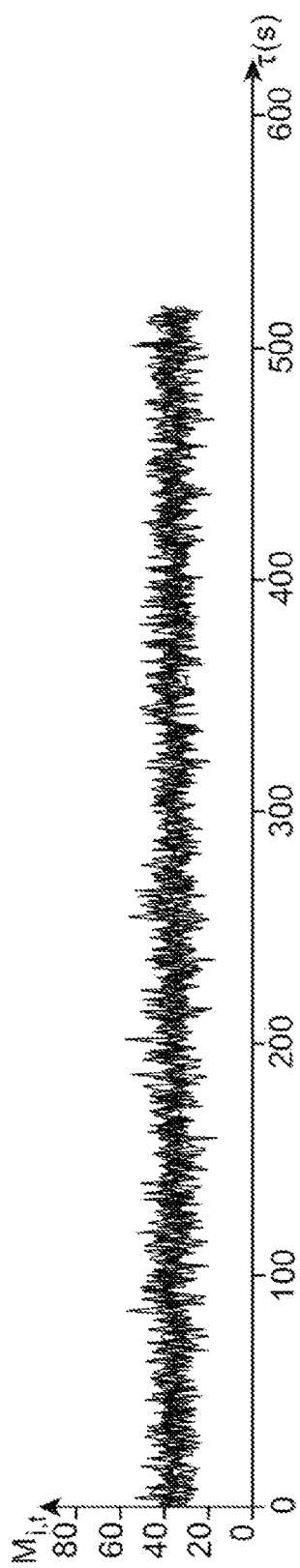
FIGS. 5A and 5B illustrate the method for detecting a radioactive source of the invention in the case of a low intensity and high speed radioactive source.
Figure 5B:
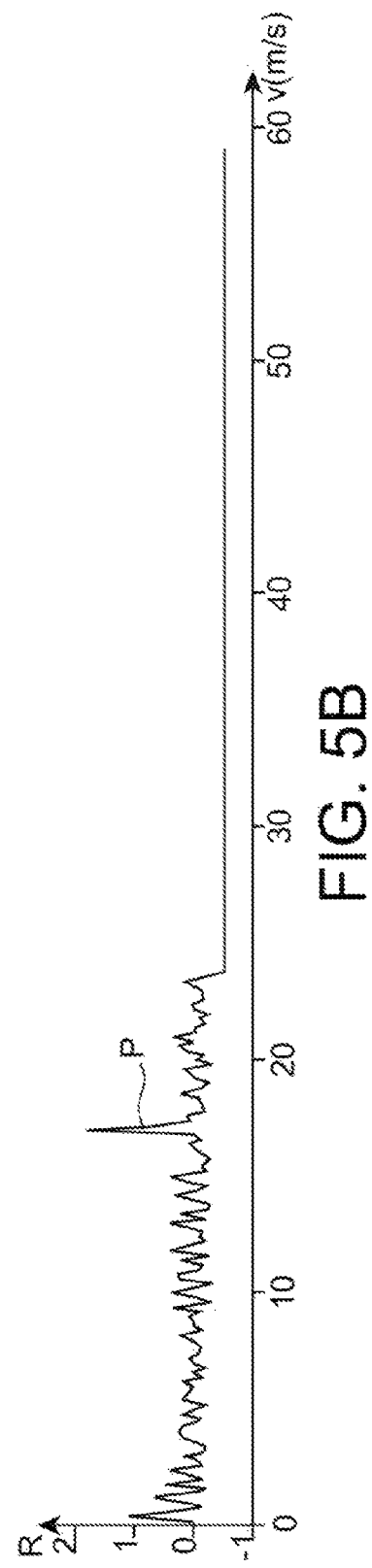

FIGS. 5A and 5B illustrate the method for detecting a radioactive source of the invention in the case of a low intensity and high speed radioactive source.

FIGS. 5A and 5B respectively correspond to the preceding FIGS. 4A and 4B. The speed of the source moving in front of the detectors is here equal to 17 m/s. A correlation peak P at a speed substantially equal to 17 m/s can indeed be noticed.

Figure 6:
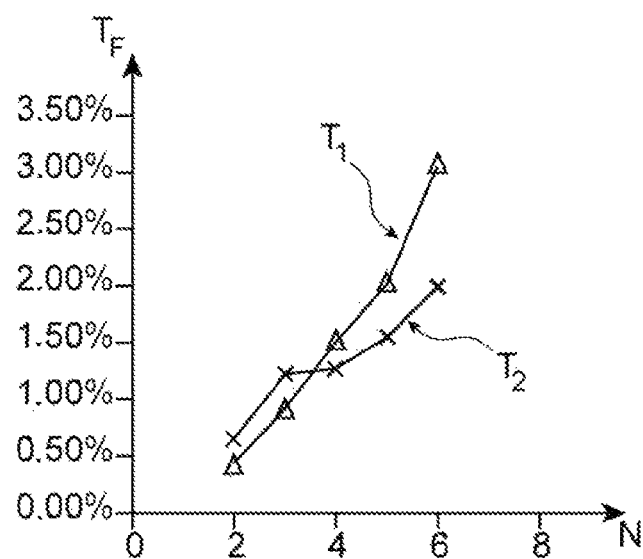
FIG. 6 shows the false alarm rate as a function of the number of used detectors, for a device of the invention and for a prior art device.

FIG. 6 illustrates the false alarm rate $T_F$ as a function of the number of detectors N, for a thresholding detection device according to the prior art (curve $T_1$) and for a correlation detection device according to the invention (curve $T_2$), all other things being equal. Very advantageously, it can be noticed that, beyond three detectors, the false alarm rate is very substantially lower with the detection device of the invention.

Figure 7:
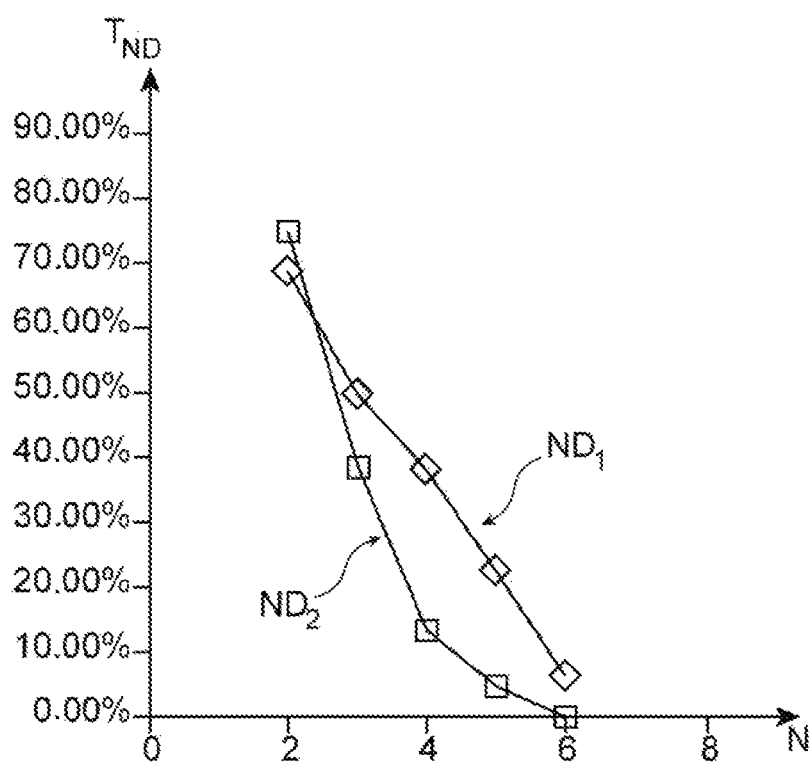
FIG. 7 shows the non-detection rate of a radioactive source as a function of the number of used detectors, for a device of the invention and for a prior art device.

FIG. 7 illustrates the non-detection rate $T_{ND}$ as a function of the number of detectors N, for a thresholding detection device according to the prior art (curve $ND_1$) and for a correlation detection device according to the invention (curve $ND_2$), all other things being equal. Also very advantageously, it can be noticed that the non-detection rate is very substantially lower with the detection device of the invention.

Figure 8:
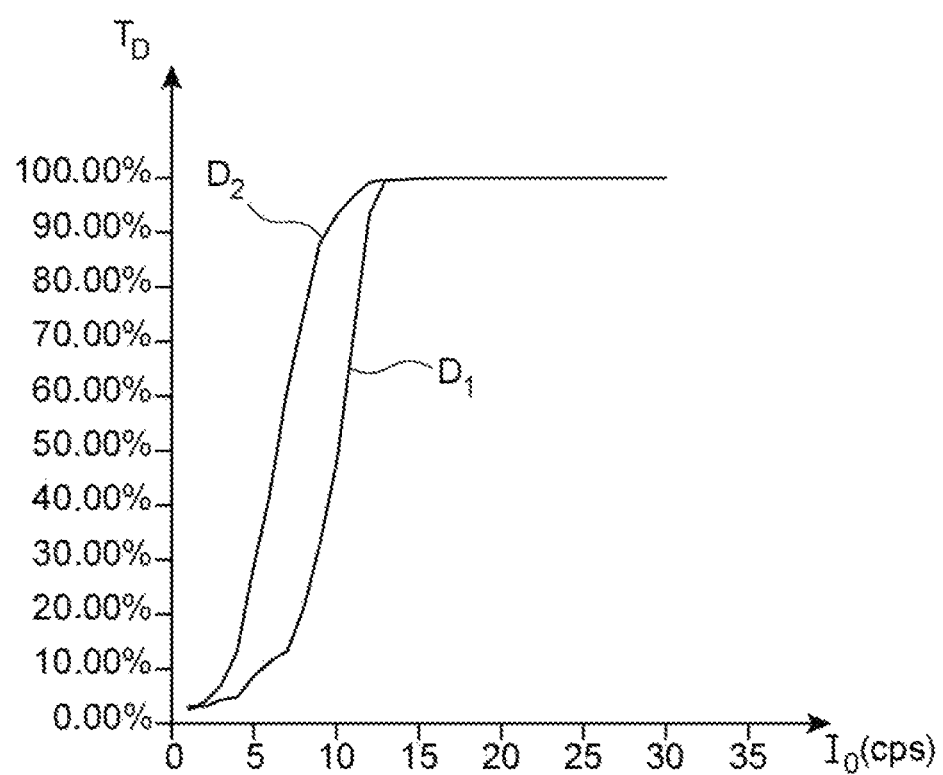
FIG. 8 shows the detection rate of a radioactive source as a function of the intensity of the signal emitted by the source, for a device of the invention and for a prior art device.

FIG. 8 illustrates the detection rate $T_D$ as a function of the signal intensity $I_0$ (expressed as a counting rate or as a number of hits per second (cps)) between a thresholding detection device according to the prior art and a correlation detection device according to the invention. In each case, the detection device comprises six detectors. Curve $D_1$ represents the detection rate of the prior art device and curve $D_2$ represents the detection rate of the invention device. Particularly advantageously, it appears that the detection rate of the device of the invention is always very substantially greater than the one of the prior art device for a counting rate between 2 and 13 cps, both detection rates being equal beyond the counting rate of 13 cps.

Figure 9A:
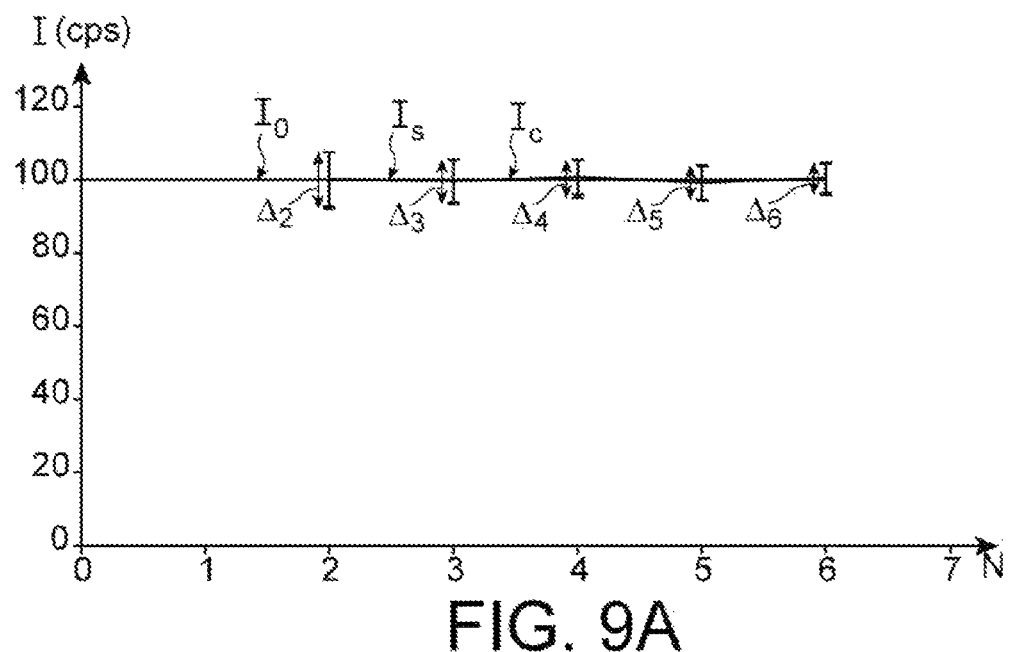
FIGS. 9A and 9B each show the measured intensity of two radioactive sources of different intensity, as a function of the number of detectors, for a device of the invention and for a prior art device.

FIG. 9A shows the measured intensity of a strong intensity radioactive source as a function of the number N of detectors, for a thresholding detection device according to the prior art and for a correlation detection device according to the invention. The intensity $I_0$ of the source is, for example, equal to 100 hits per second. It appears that the intensity $I_S$ measured by the prior art device and the intensity $I_C$ measured by the invention device are identical and equal to $I_0$, whatever the number of detectors. The measurement inaccuracy which is represented by the intervals $\Delta_i$ (i=1, 2, . . . , 6) in FIG. 9A is also identical for both detection devices.

Figure 9B:
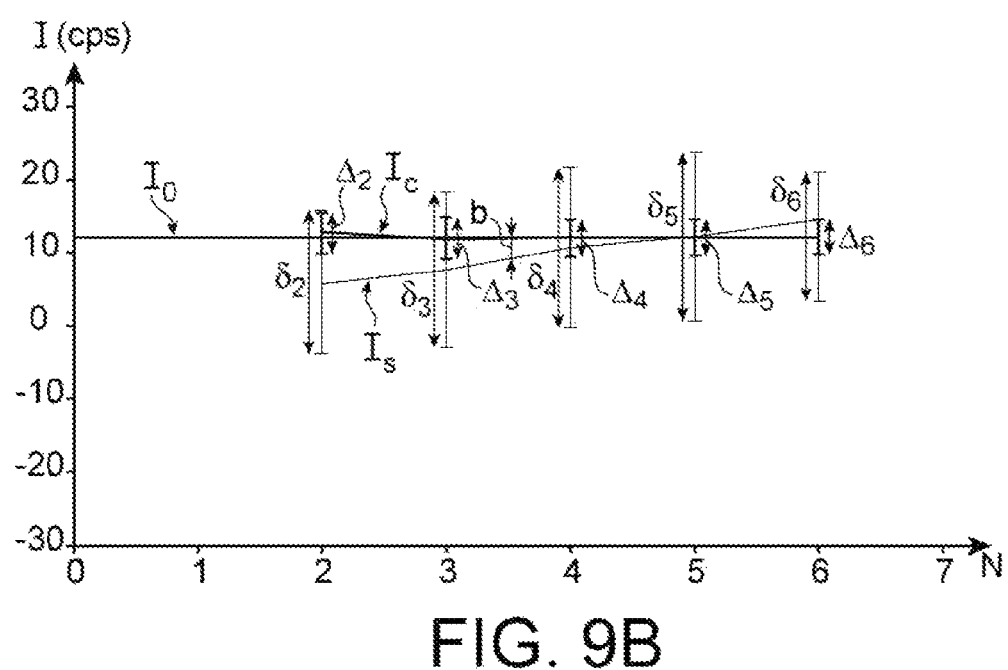

FIG. 9B shows the measured intensity of a low intensity radioactive source as a function of the number N of detectors, for a thresholding detection device according to the prior art and for a correlation detection device according to the invention. The source intensity $I_0$ is for example equal to 12 hits per second. It appears that the intensity $I_C$ measured by the invention device is very substantially equal to the emitted intensity $I_0$ whatever the number of detectors. On the contrary, the intensity $I_S$ measured by the prior art device is very different from the emitted intensity $I_0$. Similarly, whereas the inaccuracy $\Delta_i$ of the measurements read by the invention device is relatively low, the inaccuracy $\delta_i$ of the measurements read by the prior art device is high. Furthermore, a bias b of the measurements read by the prior art device appears, which is not the case of the measurement read by the invention device.

What is claimed is:

1. A method for detecting a radioactive source moving on a linear path substantially parallel to an alignment of N detectors, N being an integer equal to or greater than 2, the method comprising:

simultaneously detecting N signals by N detectors;

delivering $N \times N_t$ detection signals from the N detectors in the form of a succession over time of $N_t$ sets of the N signals simultaneously detected by the detector over a duration Δt, $N_t$ being significantly greater than N, a pulse counting value representing a number of pulses detected by a detector over a duration Δt;

forming $N \times N_t$ pulse counting values $M_{i,t}$ (i=1, 2, . . . , N and t=1, 2, . . . , $N_t$) from the $N \times N_t$ detection signals;

computing, using a computer:

a set of $N_R$ correlation products $R_z$ so that:

$$R_z = \Pi_{i=1}^{N} M_{i,[(N-i)z+1]} \ (z=1,2, \ldots, N_R)$$

with $N_R$ being an integer equal to $$\frac{N_t - 1}{N - 1},$$

a statistical mean $\overline{R}$ of the $N_t$ products $\Pi_{i=1}^{N} M_{i,t}$ such that:

$$\overline{R} = \frac{1}{N_t}\sum_{t=1}^{N_t}\prod_{i=1}^{N} M_{i,t}$$

a standard deviation $\sigma(\overline{R})$ of the $N_t$ products $\Pi_{i=1}^{N} M_{i,t}$, and a correlation condition for each correlation product $R_z$; and determining that a radioactive source moved in front of the detectors if $R_z \geq \overline{R} + K_2 \sigma(\overline{R})$, $K_2$ being a scalar, or determining that no radioactive source moved in front of the detectors if $R_z < \overline{R} + K_2 \sigma(\overline{R})$.

2. The method according to claim 1, the method further comprising computing, by the computer, a speed V of the radioactive source as soon as a radioactive source is determined to have moved in front of the detectors, such that:

$$V = d/(T \times \Delta t),$$

where d is a distance separating two neighbouring detectors and T is a rank t of a set of N pulse counting values for which the correlation product $R_Z$ is maximum.

3. The method according to claim 1, the method further comprising computing, by the computer, an intensity I of the radioactive source as soon as a radioactive source is determined to have moved in front of the detectors, such that:

$$I = \frac{1}{N} \sum_{i=1}^{N} M_{i,(N-i)T+1} - \frac{1}{N \times N_t} \sum_{t=1}^{N_t} \left[ \sum_{i=1}^{N} M_{i,t} \right].$$

4. The method according to claim 1, further comprising smoothing the pulse counting values before computing.

5. A device for detecting a radioactive source moving over a substantially linear path, the device comprising:
- N detectors ($D_i$, i=1, 2, ..., N) substantially aligned parallel to the linear path of the radioactive source, N being an integer equal to or greater than 2, the N detectors simultaneously delivering N detection signals over duration $\Delta t$,
- N processing circuits ($T_i$, i=1, 2, ..., N) connected to the N detectors, each processing circuit being configured to deliver an electronic signal corresponding to a detection signal delivered by a different detector,
- N counting circuits ($K_i$, i=1, 2, ..., N) connected to the N processing circuits, each counting circuit being configured to count, during $N_t$ successive counting durations $\Delta t$, a number of electronic pulses delivered by a different processing circuit and to deliver, for each counting duration $\Delta t$, a pulse counting value ($M_{i,t}$) (t=1, 2, ..., $N_t$), $N_t$ being significantly greater than N,
- a memory block (B) that stores the $N \times N_t$ pulse counting values delivered by the N counting circuits during the $N_t$ successive counting durations,
- a computer configured to compute:
  - a set of $N_R$ correlation products $R_z$ so that:

$$R_z = \Pi_{i=1}^{N} M_{i,([N-i]z+1]} \ (z=1,2,\ldots,N_R)$$

with $N_R$ being an integer equal to $$\frac{N_t - 1}{N - 1},$$

- a statistical mean $\overline{R}$ of the $N_t$ products $\Pi_{i=1}^{N} M_{i,t}$ such that:

$$\overline{R} = \frac{1}{N_t} \sum_{t=1}^{N_t} \prod_{i=1}^{N} M_{i,t}$$

- a standard deviation $\sigma(\overline{R})$ of the $N_t$ products $\Pi_{i=1}^{N} M_{i,t}$, and
  - a correlation condition for each correlation product $R_z$, the computer being further configured to determine that:
    - a radioactive source moved in front of the detectors if $R_z \geq \overline{R} + K_2 \sigma(\overline{R})$, $K_2$ being a scalar, or
    - no source moved in front of the detectors if $R_z < \overline{R} + K_2 \sigma(\overline{R})$.

6. The device according to claim 5, the computer being further configured to compute a source speed V if $R_z \geq \overline{R} + K_2 \sigma(\underline{R})$, such that:

$$V = d/(T \times \Delta t),$$

where d is a distance separating two neighbouring detectors and T is a rank t of a set of N pulse counting values for which the correlation product $R_Z$ is maximum.

7. The device according to claim 5, the computer being further configured to compute a source intensity I if $R_z \geq \overline{R} + K_2 \sigma(\overline{R})$, such that:

$$I = \frac{1}{N} \sum_{i=1}^{N} M_{i,(N-i)T+1} - \frac{1}{N \times N_t} \sum_{t=1}^{N_t} \left[ \sum_{i=1}^{N} M_{i,t} \right].$$

* * * * *

UNITED STATES PATENT AND TRADEMARK OFFICE
CERTIFICATE OF CORRECTION

PATENT NO. : 9,739,893 B2
APPLICATION NO. : 14/761466
DATED : August 22, 2017
INVENTOR(S) : Romain Coulon et al.

It is certified that error appears in the above-identified patent and that said Letters Patent is hereby corrected as shown below:

On the Title Page

At item (73) "ATOMIGUE" should read -- ATOMIQUE --

Signed and Sealed this
First Day of May, 2018

Andrei Iancu
*Director of the United States Patent and Trademark Office*